United States Patent [19]
James

[11] Patent Number: 5,898,876
[45] Date of Patent: Apr. 27, 1999

[54] EFFICIENT ARBITRATION WITHIN POINT-TO-POINT RINGLET-BASED COMPUTER SYSTEMS

[75] Inventor: David V. James, Palo Alto, Calif.

[73] Assignee: Apple Computer, Inc., Cupertino, Calif.

[21] Appl. No.: 08/821,442

[22] Filed: Mar. 21, 1997

[51] Int. Cl.[6] .................................................. G06F 15/163

[52] U.S. Cl. .................... 395/200.81; 395/728; 370/450; 370/452

[58] Field of Search ................................ 395/728, 200.81, 395/200.83; 370/389, 452, 447, 450, 451, 460, 462

[56] References Cited

U.S. PATENT DOCUMENTS

| | | | |
|---|---|---|---|
| 5,280,584 | 1/1994 | Caesar et al. | 395/873 |
| 5,428,649 | 6/1995 | Cecchi | 375/372 |
| 5,537,418 | 7/1996 | Donley | 370/503 |
| 5,590,124 | 12/1996 | Robins | 370/258 |
| 5,659,781 | 8/1997 | Larson | 395/800.11 |
| 5,751,715 | 5/1998 | Chan et al. | 370/452 |

OTHER PUBLICATIONS

Scalable CoherentInferface (SCI), *IEEE Publication Standard 1596–1992*, pp. 83–96.

Scalable Coherent Interface (SCI), IEEE Publication Standard 1596–1992, Oct. 1992.

*Primary Examiner*—Thomas C. Lee
*Assistant Examiner*—Harold J. Kim
*Attorney, Agent, or Firm*—Burns, Doane, Swecker & Mathis, L.L.P.

[57] ABSTRACT

A method and system for providing arbitration within a ringlet-type interconnect of a computer system are described. By providing different arbitration values as part of out-of-band information and introducing asymmetry at a scrubber node, fair allocation of interconnect bandwidth is achieved. The number of arbitration values can be extended from a basic set to provide additional functionality to handle specialized traffic situations.

22 Claims, 5 Drawing Sheets

EFFICIENT ARBITRATION WITHIN POINT-TO-POINT RINGLET-BASED COMPUTER SYSTEMS

BACKGROUND

The present invention relates generally to multiprocessor systems and, more particularly, to systems and techniques for efficiently allocating communication bandwidth among nodes in such systems using a ringlet-type interconnect.

As the performance demands on personal computers continue to increase at a meteoric pace, processors have been developed which operate at higher and higher clock speeds. The instruction sets used to control these processors have been pared down (e.g., RISC architecture) to make them more efficient. Processor improvements alone, however, are insufficient to provide the greater bandwidth required by computer users. The other computer subsystems which support the processor, e.g., interconnects, I/O devices and memory devices, must also be designed to operate at higher speeds and support greater bandwidth. In addition to improved performance, cost has always been an issue with computer users. Thus, system designers are faced with the dual challenges of improving performance while remaining competitive on a cost basis.

Early personal computers typically included a central processing unit (CPU), some type of memory and one or more input/output (I/O) devices. These elements were interconnected to share information using what is commonly referred to as a "bus". Physically, buses are fabricated as a common set of wires to which inputs and outputs of several devices are directly connected.

Buses convey data and instructions between the elements of a digital computer. Local buses provide data transmission capability within a device, whereas system buses interconnect devices, such as I/O subsystems, memory subsystems and a central processor, together. In many systems, several devices compete for use of the system bus. In industry parlance, devices which can control the system bus are termed bus masters, while other devices, which are passive and respond to requests from the bus masters, are termed slaves. Some devices may operate at different times either as a slave or a bus master to accomplish different objectives.

In order to avoid bus contention, i.e., the situation where two bus masters have simultaneous control over the system bus, a bus arbiter can be provided to prioritize requests to use the bus. In such systems, a device which wishes to become a bus master will send a bus request signal to the arbiter over a dedicated line in the control bus. If the arbiter grants the bus request, then an acknowledgement or granting signal is transmitted back to the requesting device over another control line. The methodology by which the arbiter prioritizes requests is called the bus arbitration protocol. These protocols can be implemented as an ordered list of bus masters (i.e., the highest requesting bus master on the list receives a bus grant) or as state machines inside the arbiter.

The advent of multiprocessor architectures for personal computers is a recent trend in the design of these systems, intended to satisfy consumers' demand for ever faster and more powerful personal computers. In a typical multiprocessor computer system each of the processors may share one or more resources. Note, for example, the multiprocessor system depicted in FIG. 1. Therein, an exemplary multiprocessor system 5 is illustrated having seven nodes including a first CPU 10, a bridge 12 for connecting the system 5 to some other computer system 13, first and second memory devices 14 and 16, a frame buffer 18 for supplying information to a monitor, a direct memory access (DMA) device 20 for supplying information to a storage device or a network and a second CPU 22 having an SRAM device 24 connected thereto. According to the conventional paradigm, these nodes would be interconnected by a bus 26. Caches can be provided as shown to isolate some of the devices from the bus and to merge plural, small bus accesses into larger, cache-line sized accesses.

As multiprocessor systems grow more complex, i.e., are designed with more and more nodes, adapting the bus-type interconnect to handle the increased complexity becomes problematic. For example, capacitive loading associated with the conductive traces on the motherboard which form the bus becomes a limiting factor with respect to the speed at which the bus can be driven. Thus, an alternative interconnect architecture is desirable.

One type of proposed interconnect architecture for multiprocessor personal computer systems replaces the bus with a plurality of unidirectional point-to-point links and uses packet data techniques to transfer information. FIGS. 2(a) and 2(b) conceptualize the difference. Ringlets overcome the aforementioned drawback of conventional bus-type interconnects since their individual links can be clocked at high speeds regardless of the total number of nodes which are linked together. FIG. 2(a) depicts four of the nodes from FIG. 1 interconnected via a conventional bus. FIG. 2(b) illustrates the same four nodes interconnected via unidirectional point-to-point links 30, 32, 34 and 36. These links can be used to provide bus-like functionality by connecting the links into a ring (which structure is sometimes referred to herein as a "ringlet") and having each node pass-through packets addressed to other nodes. As will be appreciated by those skilled in the art, packets are formatted to include payload data as well as various overhead information including, for example, information associated with the target and source nodes' addresses. An exemplary packet format is illustrated in FIG. 2(c). Therein, the packet includes a target node identification field (Target ID), an old bit field, a command field, a source node identification field (Source ID), as well as payload data and, potentially, other fields including error detection, e.g., cyclic redundancy check (CRC) fields. Between the data packets, the system circulates filler data referred to herein as out-of-band information or idle symbols.

Like bus-type interconnect architectures, ringlets also require arbitration schemes to handle the eventuality of heavy loading and the prioritization of packets transmitted by the various nodes. For example, certain types of information may be guaranteed a predetermined amount of bandwidth, e.g., information used to generate audio and video output, regardless of the loading placed on the ringlet by the other tasks being performed by the processors. This type of information is referred to herein as "isochronous data", whose servicing may require a temporary restructuring of packet data transmission priorities. Moreover, if a node becomes blocked, i.e., is unable to transmit a packet of its own because its bypass queue is full of packets that it has received from another node and is supposed to pass on, then some technique is necessary to command the other nodes to stop sending packets until the node becomes unblocked.

Unlike bus-type interconnects where arbitration signals can be sent on dedicated signal lines, ringlets may send out-of-band control information as part of the idle symbols transmitted over the links. One example of this type of arbitration is found in the industry standard referred to as Scalable Coherent Interface (SCI), which standard is described in IEEE Publication Std 1596-1992. According to this standard, "go" bits are circulated in the ringlet as a sort of replicatable/mergeable token. A node may transmit a packet only if it has received a "go" bit as part of the out-of-band information received in an incoming packet, which "go" bit is replicated and forwarded in addition to the transmitted packet. When the need arises to throttle one or more nodes so that a blocked node can transmit a packet, the blocked node merges incoming "go" bits so that "go" bit propagation stops, which in turn precludes other nodes from transmitting packets.

This approach has several potential drawbacks. First, the "go" bits may be lost due to transmission errors, which in turn would prevent nodes from transmitting packets and reduce throughput. Second, after arbitration is resolved, "normal" packet transmission on the ringlet needs to be restarted by circulating "go" bits to the various nodes. This increases latency since "go" bit replication rates have to be constrained to provide adequate arbitration response time. I Another type of ringlet arbitration has been described in early drafts of a proposed IEEE Standard entitled "SerialExpress—A Scalable Gigabit Extension to Serial Bus". Therein, instead of "go" bits being circulated to permit nodes to transmit packets, a blocked node sends a stop indication having a six bit node identifier. Each node in the ringlet that receives this stop indication stops sending packets and passes the stop indicator on until it is received again by the originating node, which can then transmit packets.

Like the "go" bits in the first described approach, this solution is also susceptible to transmission errors which may alter the node identifier associated with the stop indicator. Special circuitry is then needed to identify and remove aberrant stop indicators which would otherwise circulate endlessly in the ringlet. Another problem associated with the arbitration proposed in the SerialExpress standard is handling of the post-arbitration recovery phase which relies on the propagation of a special "start-now" token. This token may be difficult to reliably maintain through elasticity buffers associated with the nodes which selectively delete passing-through idle symbols.

Accordingly, it would be desirable to have a more efficient arbitration scheme for ringlet-type interconnects associated with, for example, multiprocessor personal computer systems.

SUMMARY

These and other drawbacks and limitations of conventional arbitration schemes and systems are overcome according to exemplary embodiments of the present invention. According to a first exemplary embodiment of the present invention, an arbitration select value is set equal to FREE when the ringlet is in a lightly loaded or idle condition. When a node becomes blocked or when isochronous data needs to be transmitted, the affected node begins sending idle symbols having a STOP value. When received by the other nodes, the STOP value is used to halt the transmission of packets therefrom. The nodes will, however, continue to forward the STOP arbitration select values in the idle symbols. In this way, the affected node will soon be able to transmit its own packet since others will not be sending packets and will thus be able to empty its bypass queue.

When a node that is the scrubber receives an idle symbol having an arbitration select value of STOP, this node will age the arbitration select value thereby converting the STOP value to a SEND value. The SEND value is then forwarded as part of the idle symbols promulgated from the node including the scrubber. When the node which is blocked receives an idle symbol including the SEND value, it delays promulgating the SEND value until it can send its packet of data. Once its packet of data can be sent, the previously blocked node transitions from sending idle symbols having the STOP value to idle symbols having the SEND value.

When the SEND value returns to the scrubber, the scrubber converts the SEND value back to the FREE value, wherein the ringlet enters a recovery phase during which the nodes return to their idle state and packets can be sent freely between the transmission of passing-through packets.

Thus, it can be seen that arbitration protocols according to the present invention provide a mechanism whereby "arbitration levels" are created by circulating various arbitration values using out-of-band information sent between packets of data. This minimizes the detrimental effects associated with transmission or other errors impacting arbitration signaling.

According to other exemplary embodiments of the present invention, the arbitration protocol can be extended to include additional values to handle other traffic situations. For example, if a previously blocked node needs to rearbitrate before it receives an idle symbol including an arbitration select value of FREE, it can instead send idle symbols having the arbitration select value set equal to SEEN. SEEN acts as a variant of STOP to again throttle the downstream nodes. When the scrubber node receives idle symbols containing the SEEN value, it ages this value to SEEK which indicates that the once again blocked node can transmit packets.

According to some exemplary embodiments of the present invention, arbitration select values flow in the same direction as data packets. In other exemplary embodiments, arbitration select values flow in a direction opposite to that of the data packets.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

To provide some context within which to describe exemplary arbitration systems and techniques according to the present invention, an illustrative ringlet operation will now be described with respect to FIGS. 3(a)–5(b). To simplify the following discussions, the exemplary multiprocessor system of FIG. 3(a) has only three nodes, CPU 40 connected to CPU 42 which is connected to memory 44, which is in turn connected back to CPU 40 by unidirectional point-to-point links. Of course those skilled in the art will appreciate that the present invention is applicable to systems having any number of nodes.

Figure 3A:
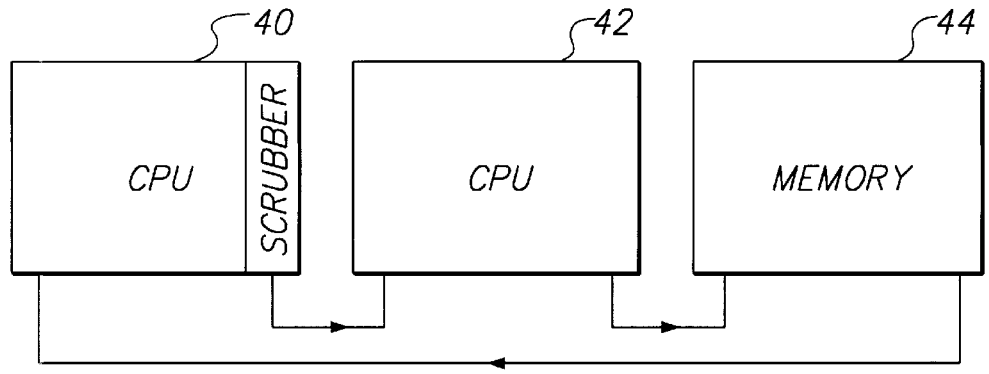
FIG. 3(a) illustrates an exemplary three node ringlet including packet handling FIFOs.

In the system of FIG. 3(a), request and response packets are used to communicate between nodes. Request packets transfer address and commands (and for writes, data); response packets return status (and for reads, data). Request and response packets travel between nodes referred to as producer and consumer, with intervening nodes simply forwarding packets without modification.

For example, suppose that CPU 40 (the producer) creates a request or response packet, addressed to memory 44 (the consumer), and sends the packet over its outgoing point-to-point link. CPU 42 receives the packet and, recognizing that it is not the intended recipient, forwards the packet over its outgoing point-to-point link. Memory 44 (the consumer) recognizes and removes the packet and sends an acknowledge packet addressed to CPU 40 to confirm successful reception of the packet.

Figure 1:
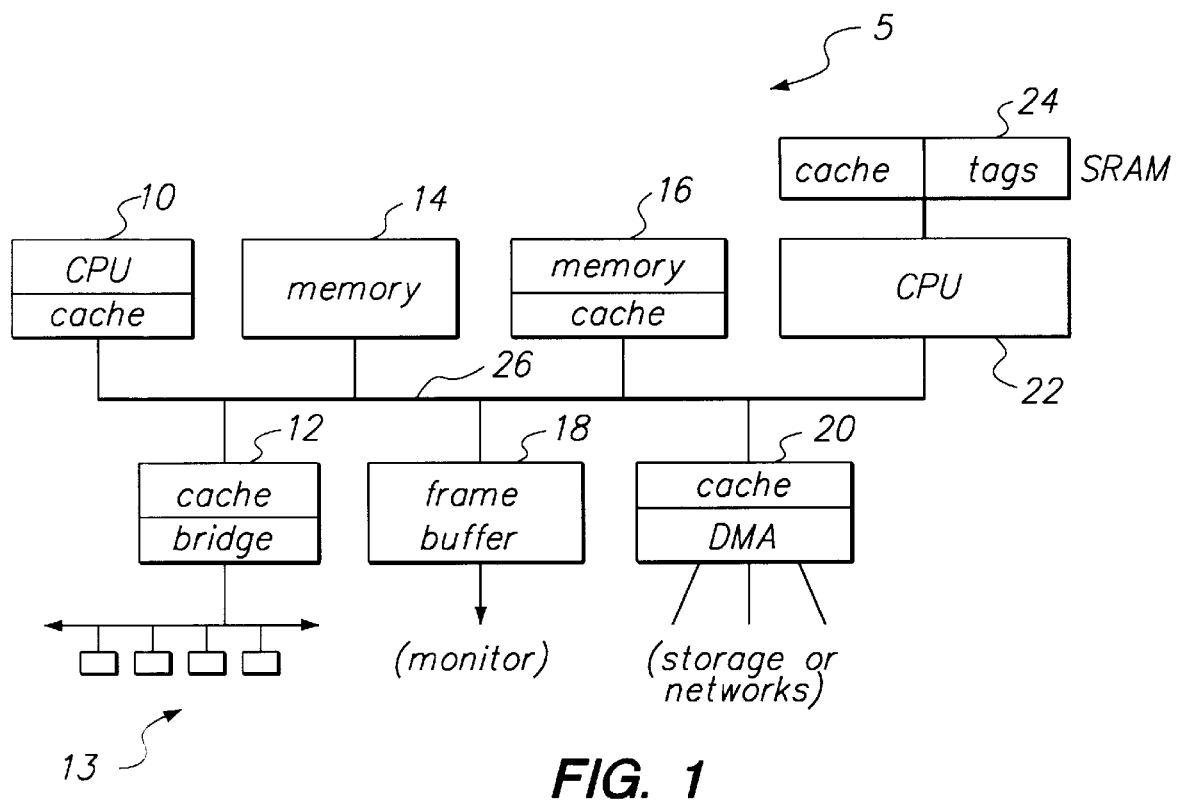
FIG. 1 is a block diagram of an exemplary multiprocessor system.
Figure 2A:
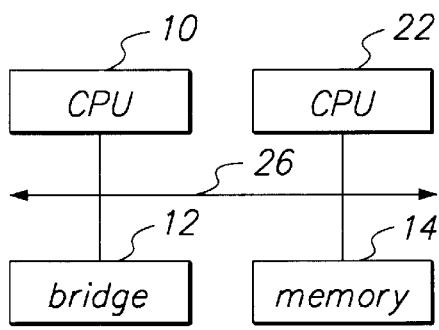
FIG. 2(a) and 2(b) are block diagrams of multinode systems which conceptually illustrate the difference between bus-type interconnects and ringlet-type interconnects.
Figure 2B:
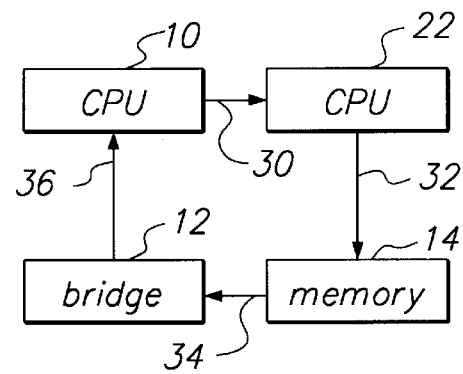
Figure 2C:
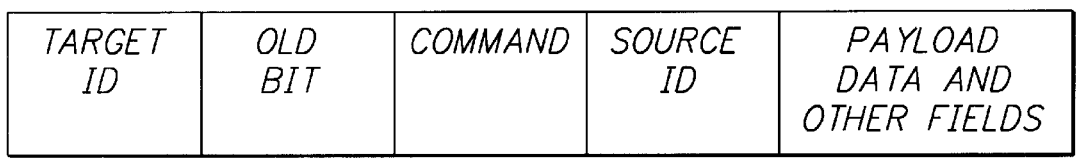
FIG. 2(c) depicts an exemplary packet format.

CPU 40 also has a scrubber associated therewith. According to exemplary embodiments of the present invention, at least one node in a ringlet will include a scrubber that performs a variety of ringlet maintenance functions and, as described below, which also performs an important role in the arbitration process. With respect to ringlet maintenance, scrubbers are used to remove incorrectly addressed packets from ringlet circulation. For example, a packet may have a non-existent node address in its address field due to transmission errors or simply being misaddressed at creation. As packets pass through the scrubber, the old bit field (see FIG. 2(c)) is changed from 0 to 1. If a packet circulates through the ring again and returns to the scrubber having its old bit field set equal to 1, the scrubber removes it so that misaddressed packets do not continue to circulate through the ringlet.

For aged request packets the scrubber has the behavior of a surrogate consumer. An aged request is accepted by the scrubber which, after processing, produces a response with an addressing error status code therein. The producer is then responsible for processing the response. Other types of aged packets, e.g., multicast, isochronous, acknowledge and response, are simply discarded when they pass through the scrubber.

Scrubbers also operate on idle symbols to control the rate of packet retransmission. Idle symbols are sent between data packets and can be used, for example, to measure ringlet circulation time. Idle symbols can also be used by the anodes to detect and compensate for gradual changes in node-to-node delays between packet transmissions. Moreover, according to exemplary embodiments of the present invention, idle symbols can include arbitration information used to control packet circulation on the ringlet as described below.

Figure 3B:
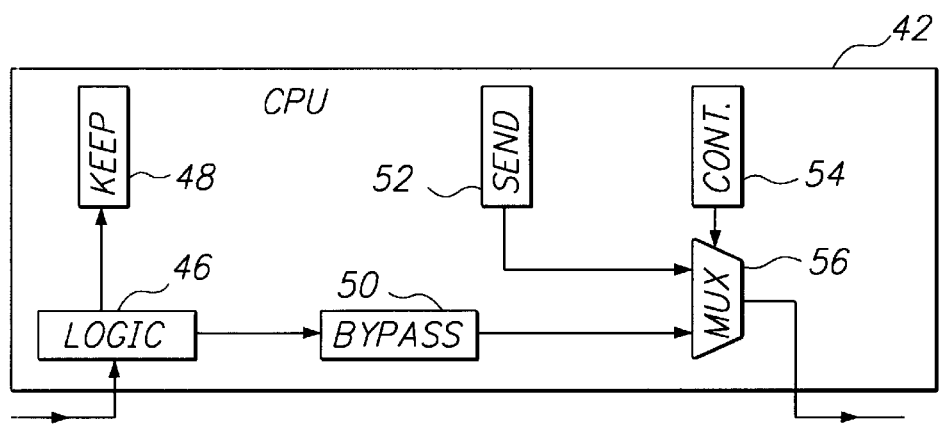
FIG. 3(b) illustrates one of the nodes of FIG. 3(a) in more details.
Figure 3C:
FIG. 3(c) depicts an exemplary format for idle symbols used to convey arbitration information according to the present invention.

Each of the nodes may also contain at least three queues (e.g., first-in-first-out (FIFO) units) for buffering packets as needed. This aspect of systems according to exemplary embodiments of the present invention is seen in FIG. 3(b), wherein node 42 is shown in more detail. The target ID of an incoming packet is evaluated by logic 46 to determine if node 42 is the intended recipient thereof. If so, the packet is forwarded to keep FIFO 48 for processing within node 42. Otherwise, if the packet is passing-through, it is forwarded to bypass FIFO 50 for buffering until transmission bandwidth is available on node 42's outgoing point-to-point link. Packets which are created by node 42 for transmission are buffered in sending FIFO 52. Controller 54 determines which of FIFOs 50 and 52 can use the outgoing link by providing the select input to multiplexor 56.

During normal, i.e., lightly loaded, conditions the FIFOs don't become fall and the system does not require arbitration. That is, for example, a packet can be sent by CPU 40 at any time except when another packet is passing through the node. If another packet arrives from memory 44 (enroute to CPU 42) while CPU 40's packet is being sent, then some or all of the passing-through packet is temporarily stored in CPU 40's bypass FIFO. The bypass FIFO can then be serviced after CPU 40's packet has been sent, allowing the incoming packet to pass through.

As traffic increases, however, and more and more nodes want to transmit packets, decisions have to be made regarding whether nodes should transmit their own packet or forward a packet that is passing-through. Since the system's default priority directs a node to continue forwarding passing-through packets until its bypass FIFO is empty, then that node may become starved for bandwidth to transmit its own packets absent arbitration. By commanding other nodes to stop transmitting packets, a particular node can acquire additional bandwidth within which to transmit its own packets. Thus, in the context of computer systems using a ringlet-type interconnect, arbitration involves the throttling of other nodes.

Arbitration protocols according to exemplary embodiments of the present invention provide arbitration signals to the various nodes of the ringlet via out-of-band information, i.e., information provided outside of the "payload" data being transmitted in the packets. For ringlets which provide serial bus-type functionality, this out-of-band arbitration information may be provided within the idle symbols transmitted between packets. For ringlets which provide parallel bus-type functionality, this out-of-band arbitration information may be provided in its own path (i.e., a side band). FIG.

3(c) depicts an exemplary format for an idle symbol including a header field that identifies this as an idle symbol, an arbitration select (as) field, two arbitration priority fields apA and apB, an arbitration circulation count (acc) field and other information. The functionality and values associated with these fields will be described in more detail below.

Figure 4A:
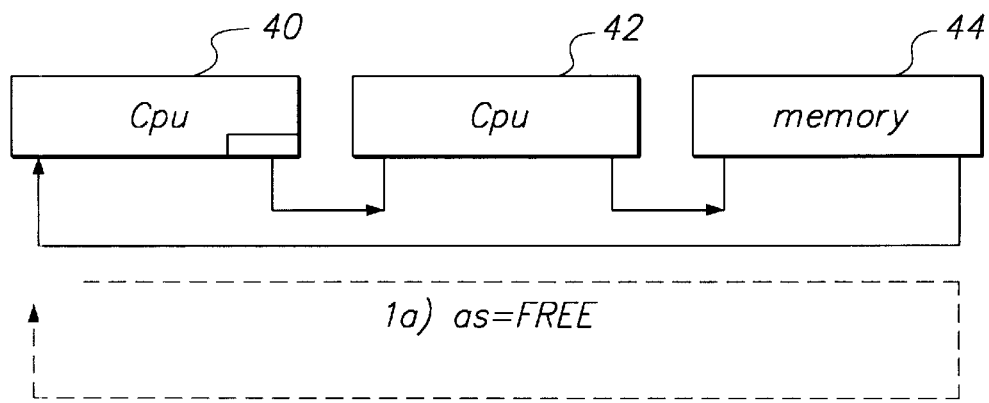
FIG. 4(a) illustrates arbitration according to an exemplary embodiment of the present invention wherein an arbitration select value is set equal to FREE.
Figure 4B:
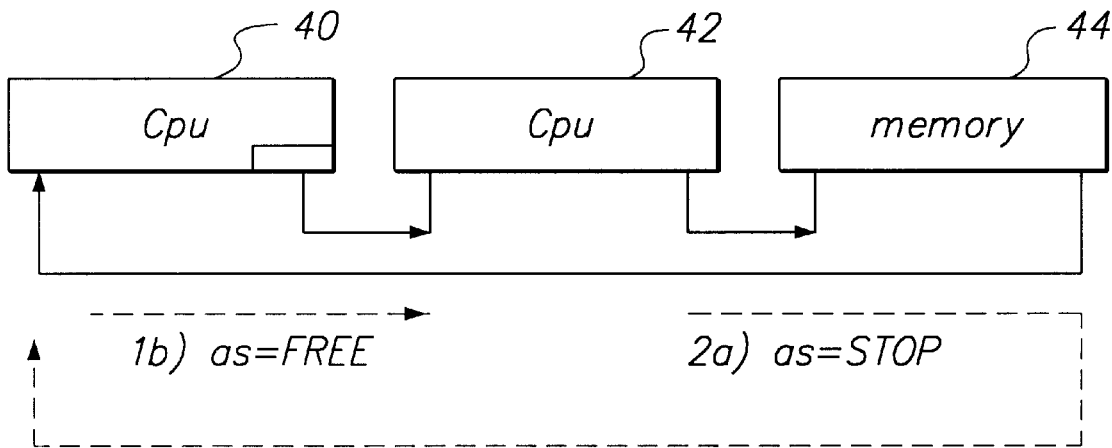
FIG. 4(b) illustrates arbitration according to an exemplary embodiment of the present invention wherein an arbitration select value is set equal to STOP.

A first exemplary arbitration protocol according to the present invention will now be described with respect to FIGS. 4(a)–4(e). Therein, note that the scrubber is denoted by the shaded corner of CPU 40. FIG. 4(a) illustrates the lightly loaded case described above where no arbitration is needed. In this situation, the arbitration select (as) value communicated to the various nodes (e.g., by setting a bit field within the idle symbols) is set equal to FREE, indicating to each node that it is free to transmit packets. If CPU 42 needs to acquire additional bandwidth, e.g., to transmit isochronous packets, then it will begin sending idle symbols having an arbitration select value set to STOP as shown in FIG. 4(b). Note that unlike the above-described SerialExpress solution, the STOP value according to this exemplary embodiment does not identify the node which asserted the STOP value. As seen in FIG. 4(b), when CPU 42 begins transmitting idle symbols having the STOP value, the ringlet will temporarily be in a state wherein some idle symbols are circulating with the FREE value and some with the STOP value.

Figure 4C:
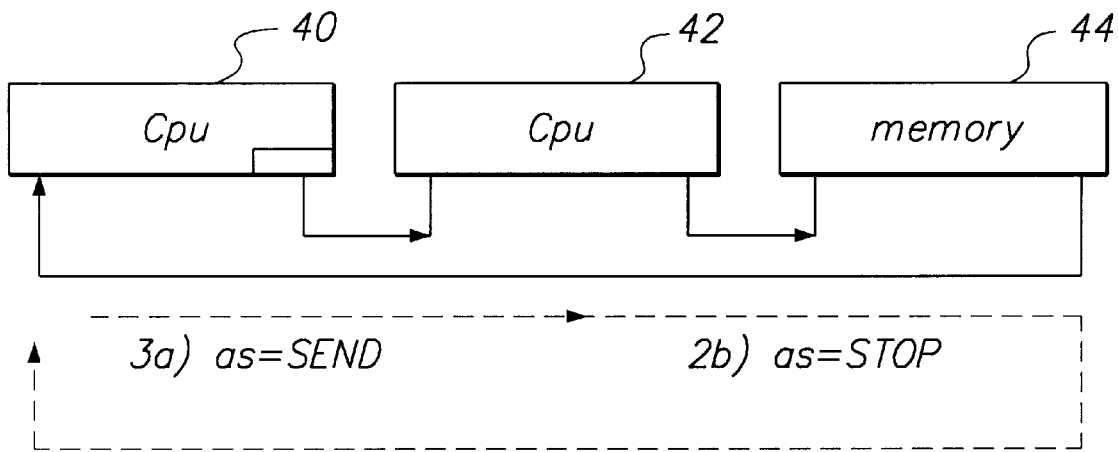
FIG. 4(c) illustrates arbitration according to an exemplary embodiment of the present invention wherein a scrubber node has converted an arbitration select value from STOP to SEND.

As nodes receive idle symbols containing the STOP value, they cease transmitting packets (unless they are transmitting isochronous packets). To limit STOP indication propagation, the scrubber associated with CPU 40 converts the passing-through STOP value to SEND as shown in FIG. 4(c). The SEND indication informs nodes receiving these idle symbols that it is permissible to send another packet until a second SEND value is received. Thus, if there were a fourth node intermediate CPU 40 and CPU 42, that node would stop sending packets after receipt of a second idle symbol having the SEND value. In this example, however, CPU 40 will stop sending packets (due to receipt of the STOP value) and will forward idle symbols having the SEND value to CPU 42. At CPU 42 the input/output arbitration select value transition from SEND/STOP to SEND/SEND is delayed while CPU 42 empties its bypass FIFO so that its next packet can be sent.

Figure 4D:
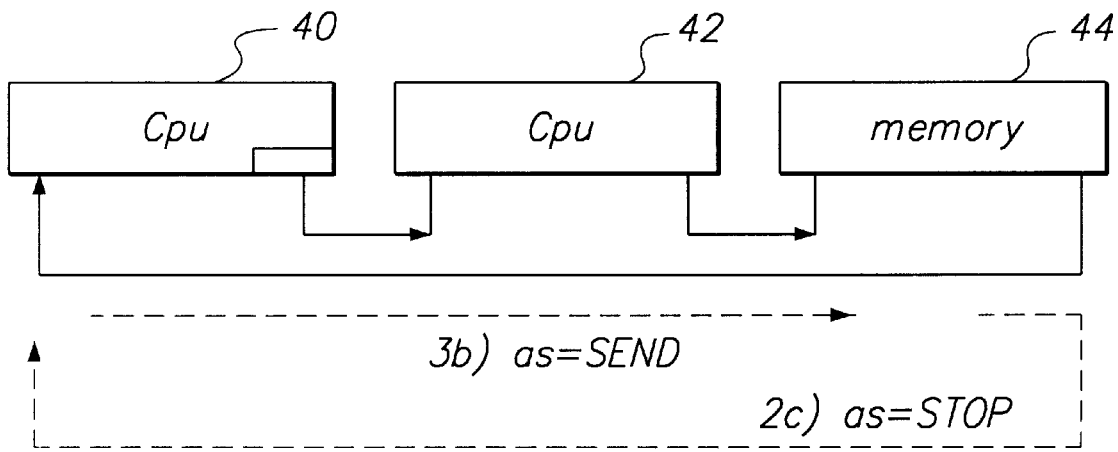
FIG. 4(d) illustrates arbitration according to an exemplary embodiment of the present invention wherein a previously blocked node has begun to forward idle symbols inching an arbitration select value of SEND.

In this way, arbitration schemes according to this exemplary embodiment of the present invention have satisfied CPU 42's need for additional bandwidth. Note that once CPU 42 has sent its own packet, it will then forward SEND values via the idle symbols that are transmitted over its outgoing point-to-point link as shown in FIG. 4(d). This provides an opportunity for any other blocked, downstream nodes (e.g., memory 44) to empty their bypass FIFOs by delaying the SEND/STOP transition and proceeding as described above with respect to CPU 42.

Figure 4E:
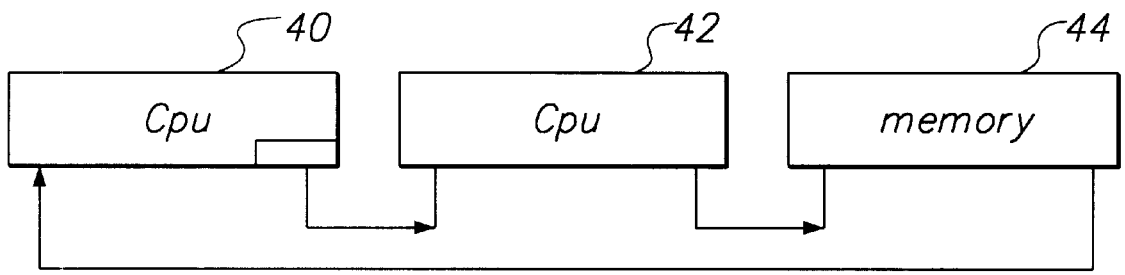
FIG. 4(e) illustrates arbitration according to an exemplary embodiment of the present invention wherein a scrubber node has converted an arbitration select value from SEND to FREE.
Figure 5A:
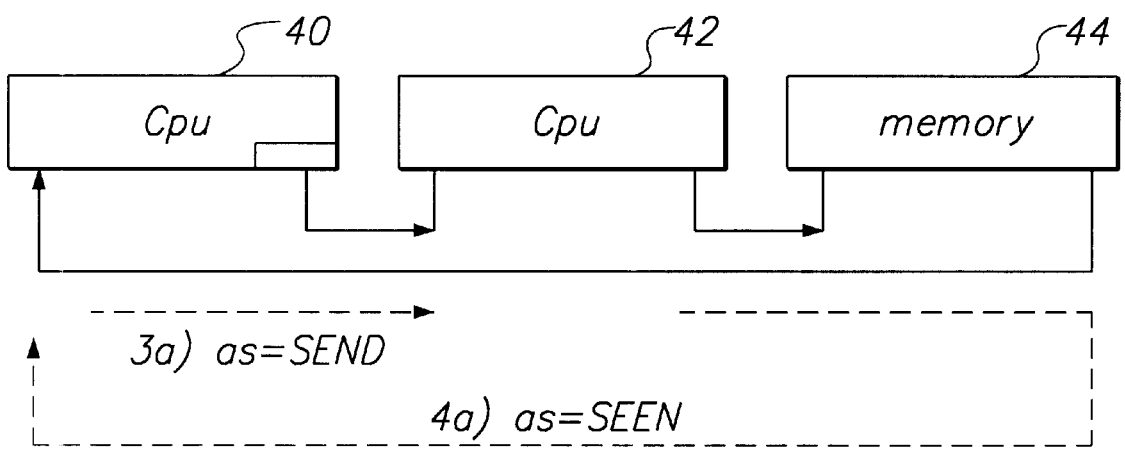
FIG. 5(a) illustrates arbitration according to another exemplary embodiment of the present invention wherein a previously blocked node has again become blocked and begins to forward idle symbols having an arbitration select value set equal to SEEN.
Figure 5B:
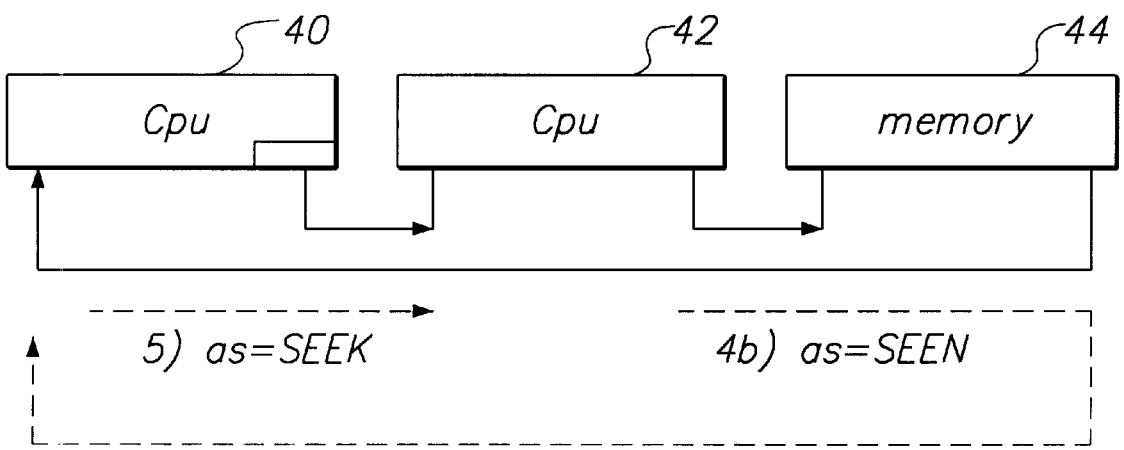
FIG. 5(b) illustrates arbitration according to the exemplary embodiment of FIG. 5(a) wherein a scrubber node has converted an arbitration select value from SEEN to SEEK.

After packets have been sent, i.e., the arbitration has been resolved, the ringlet then needs to recover from the arbitration and return to the lightly loaded state. At this time idle symbols containing the SEND value will return to the scrubbing node, in this case CPU 40. The scrubber converts the SEND values to FREE values, as shown in FIG. 4(e). The FREE indication restores the nodes to their "normal" operating status wherein each node can transmit its own packets between transmissions of any passing-through packets.

According to the foregoing exemplary embodiment, three arbitration select values (FREE, STOP and SEND) are provided for controlling the allocation of ringlet bandwidth in a computer system. Thus, 2 bits (uncoded) can be used to convey these values within the idle symbol. Of course, those skilled in the art will appreciate that additional functionality can be provided to extend the foregoing concepts by providing additional arbitration select values. For example, in highly congested systems, CPU 42 may need to rearbitrate after its packet has been sent, but before the SEND indication has returned to the scrubber to begin ringlet recovery. Thus, CPU 42 is still receiving idle symbols containing the SEND value. In such a case, according to another exemplary embodiment of the present invention, the once again blocked node CPU 42 converts the SEND value to a new value referred to herein as SEEN as illustrated in FIG. 6(a).

The SEEN value operates to inform downstream nodes that they should again stop sending packets. However, downstream nodes which are themselves still blocked may continue to delay the above-described SEND/STOP transition and send packets until they become unblocked. The SEEN arbitration select value is promulgated around the ringlet until it reaches the scrubber, wherein it is converted to a SEEK value. When CPU 42 receives the SEEK value, it can then send its second packet of data. After idle symbols including the SEEK value return to the scrubber, they are aged back to FREE.

Thus, Table 1 summarizes the arbitration select values used in the foregoing exemplary embodiments.

TABLE 1

| Arbitration Select Values | | |
|---|---|---|
| as value | as name | Description |
| 0 | FREE | Idle; unrestricted packet sending allowed. |
| 1 | STOP | Blocked, packet sending stops. |
| 2 | SEND | Phase2, send packets fairly. |
| 3 | SEEN | Phase3, packet sent fairly, another send blocked. |
| 4 | SEEK | Phase4, an aged version of SEEN. |

Those skilled in the art will recognize that the foregoing arbitration select values affect the transmissions of nodes which are transmitting non-isochronous packets. Those nodes which are transmitting isochronous packets are effectively exempt from throttling. That is, a node which is transmitting isochronous data has no duty to respond to STOP arbitration select values and no duty to transition from passing the SEND/STOP transition to the next downstream node until it completes transmission of isochronous data. According to other exemplary embodiments, additional priority levels can be provided within arbitration protocols according to the present invention.

For example, suppose that a particular node is assigned a priority of five relative to other nodes in the ringlet. If this node wishes to acquire additional bandwidth it can, in addition to sending an arbitration select value of STOP in idle symbols, assert its priority in another out-of-band field within the idle symbols. This field is referred to herein as apA (0 . . . 3), although any number of bits may be used to convey arbitration priority values. When received downstream, lower priority nodes will throttle their transmission of data packets while higher priority nodes will not. This arbitration priority, however, is subject to the exception that all nodes will periodically be permitted to send a packet regardless of whether higher priority nodes are trying to obtain more bandwidth, in order to avoid the situation where low priority nodes are prevented from transmitting any non-isochronous packets for an extended period of time.

This exception can be implemented by, for example, providing another field in the idle symbols referred to herein as an arbitration circulation count filed. This field can be incremented by the scrubber as idle symbols circulate therethrough. When the value of the arbitration circulation count field changes (indicating that all nodes should have had a chance to send), nodes reading this field may temporarily ignore throttling commands from higher priority nodes to transmit a packet of their own. Another arbitration priority field, apB(0 . . . 3), can also be included within the idle symbols and is used to age and retire priority assertion as described below in connection with scrubber operation.

Figure 6:
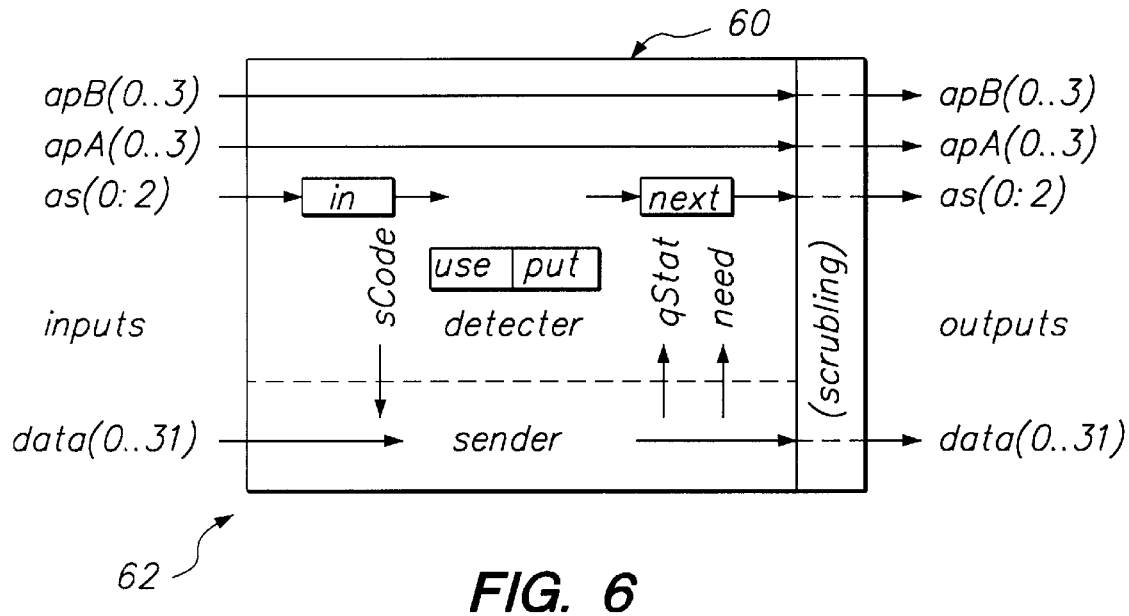
FIG. 6 depicts a more detailed diagram of a node according to an exemplary embodiment of the present invention.

Having described exemplary arbitration protocols according to the present invention, a more detailed example of a node which operates in accordance with these protocols will now be provided with reference to FIG. 6. Therein, the node is separated into a detector 60 and a sender 62. The detector 60 receives and processes the out-of-band arbitration select values as(0:2), as well as the optional arbitration priority values apA(0 . . . 3) and apB(0 . . . 3) described above. Sender 62 handles the forwarding of incoming data packets received from the node immediately downstream over the node's point-to-point links, as well as the transmission of packets created within the node. Thus, sender 62 also includes a bypass queue (e.g., a FIFO, not shown) and a sending queue (e.g., a FIFO, not shown) for buffering packets as they are received/created for subsequent output. Communication between the detector 60 and sender 62 involves several indicators. For example, the qStat indicator informs the detector 60 that the sender 62's bypass FIFO is fill, so that detector 60 can adjust the arbitration select values as described above to reflect the node's blocked status and acquire additional bandwidth. The detector 60, on the other hand, drives the sCode indicator to throttle the sender 62 based on current ringlet arbitration conditions, e.g., when the detector 60 receives a STOP arbitration select value or consecutive SEND values. The need indicator can be driven by the sender 62 when, for example, isochronous traffic needs to preempt other traffic. Each of these indicators will now be described in more detail.

As will be apparent to those skilled in the art, the qStat indicator directly affects arbitration decisions made by detector 60. This indicator can itself take various values which reflect the status of the node's bypass and sending FIFOs, exemplary values of which are summarized in Table 2.

TABLE 2

Internal *qStat* Sense Values

| qStat value | bypass FIFO | sending FIFO | send start | Description |
|---|---|---|---|---|
| MORE | not empty | not empty | no | Recovery incomplete, send packet is queued. |
| SOME | not empty | empty | no | Recovery complete, no send packet queued. |
| SOON | empty | not empty | no | Recovery complete, send packet is queued. |
| NONE | empty | empty | no | Recovery complete, no send packet queued. |
| DONE | empty | not empty | yes | First send-packet symbol being sent. |

In the sender's most congested condition, i.e., when the node hasn't recovered from a previous packet transmission and another packet is also ready to be sent by that node, the MORE value is driven as the qStat indication. This informs the detector 60 to start transmitting idle symbols wherein the arbitration select value is set equal to STOP. In the least congested condition, i.e., when neither the bypass nor the sending queues have packets awaiting transmission, the qStat indication is driven by the sender 62 using the NONE value. Note also the DONE value, which is asserted by the sender 62 when a packet has been sent. Upon receipt of the DONE value, detector 60 will stop delaying the transmission of idle symbols having the arbitration select value of SEND, thereby beginning ringlet recovery.

The qStat indication values of SOON and SOME represent optional optimizations which, used in conjunction with the use, put and set bits, described below, aid in reducing ringlet latency caused by transient arbitration conditions. SOON is driven as the qStat indication when the node has a packet to send, but its bypass FIFO is empty. Thus, if this node receives an indication that it can send a packet, e.g., receipt of an idle symbol having the SEND value, then it can send its packet and need not delay transitioning from STOP to SEND in the arbitration select values being forwarded. For example, if the node was in the process of forwarding a passing-through packet, SOON would alert the detector 60 that even though a packet was waiting in the sending FIFO, the detector should forward the SEND value.

The SOME value prevents queuing of the arbitration grant (e.g., the SEND arbitration select value) when the bypass FIFO is full but the node has none of its own packets to send. That is, detector 60 is instructed not to delay transitioning from STOP to SEND in the arbitration select values being forwarded when the node has no interest in throttling downstream nodes.

The detector 60 imposes arbitration protocol commands on the sender 62 using the sCode indication. According to an exemplary embodiment of the present invention, exemplary sCode values are shown in Table 3 below.

TABLE 3

Internal *sCode* Control Values

| sCode value | Sending of Packets | Description |
|---|---|---|
| PUSH | enabled | normal idle condition |
| WAIT | disabled | fair arbitration backoff |

The PUSH value of sCode tells sender 62 that the next packet held in its sending queue (if any) can be sent at the next opportunity between packets received for forwarding from the immediately downstream node. The WAIT value, which can be asserted by the detector when, for example, an arbitration select value of STOP is received in an idle symbol, inhibits the sender's ability to send packets. However, even when sensing an sCode value of WAIT, the sender 62 may consume idle symbols to empty the node's bypass queue.

The detector 60 can, according to exemplary embodiments of the present invention, consider several factors in determining whether to assert WAIT or PUSH as the sCode value. For example, as an intermediate step, the detector calculates values for use, put and set bits. The use and put bits are used to retain knowledge of recent unthrottled and enabled conditions and to minimize the impact of transient assertions of complementary arbitration-delaying (throttled and disabled) conditions. Specifically, the use bit is set to one in the absence of an observed (higher-priority node asserted) throttling condition. The value of the use bit can be calculated as:

use=(qStat==SOME||qStat==MORE||qStat==SOON)&&((apA==0&&apB==0)||use);

In this equation, and those that follow, C-code notation is used. The "==" operator performs a test for equality, "||" is a Boolean 'OR' operation and "&&" is a Boolean 'AND' operation. This bit has the effect of delaying throttling of a lower priority node that was previously allowed to send a packet and is about to send a packet in the interests of optimizing throughout. The put bit is set to one when packet-sending from an unthrottled node is allowed. Thus, the value of the put bit can be set based on:

put=(qStat==NONE||qStat==SOON)&&(set||put);

The set bit is used to reflect the arbitration select value's contribution to the put bit set to one when a packet sending would be enabled on an unblocked/unthrottled node. Table 4 depicts the set bit values for various states of the received arbitration select values, as well as depicting the delay of the transition from SEND/STOP to SEND/SEND described above for blocked nodes or nodes that are transmitting isochronous data.

TABLE 4

Arbitration Updates

| | Next State | | | |
|---|---|---|---|---|
| | qStat==MORE \|\| need==1 | | | |
| current in states | use==1\|\| need==1 | !(use==1\|\| need==1) | !(qStat==MORE \|\| need==1) | set |
| FREE-FREE | STOP | STOP | input | 1 |
| SEEK-FREE | " | " | " | 1 |
| STOP-FREE | " | " | " | 1 |
| SEND-FREE | " | SEEN | " | 1 |
| SEEN-FREE | " | " | " | 1 |
| FREE-SEEK | STOP | STOP | input | 1 |
| SEEK-SEEK | " | " | " | 0 |
| STOP-SEEK | " | " | " | 0 |
| SEND-SEEK | SEND | SEND | " | 0 |
| SEEN-SEEK | SEEN | SEEN | " | 0 |
| FREE-STOP | STOP | STOP | " | 1 |
| SEEK-STOP | " | " | " | 1 |
| STOP-STOP | " | " | " | 0 |
| SEND-STOP | STOP | SEEN | " | 1 |
| SEEN-STOP | " | " | " | 1 |
| FREE-SEND | STOP | STOP | " | 1 |
| SEEK-SEND | " | " | " | 1 |
| STOP-SEND | " | " | " | 0 |
| SEND-SEND | SEEN | SEEN | " | 0 |
| SEEN-SEND | " | " | " | 0 |
| FREE-SEEN | STOP | STOP | " | 1 |
| SEEK-SEEN | " | " | " | 1 |
| STOP-SEEN | " | " | " | 0 |
| SEND-SEEN | SEEN | SEEN | " | 0 |
| SEEN-SEEN | " | " | " | 0 |

The sCode indicator is driven based on the node sender's qStat (send queue state), the observed apA/apB (ringlet arbitration priorities), the set bit value and the current use/put bit values, as set forth below.

sCode=(need || (use && (qStat==MORE ? set:put))) ? PUSH; WAIT;

Finally, the sender 62 has the option of asserting the need indicator if prescheduled isochronous traffic lag behind their prescheduled delivery times. The effect of this assertion is that 1) sending of all non-isochronous traffic is quickly stopped and 2) send-inhibit indications from other nodes are ignored. This allows, isochronous traffic to proceed efficiently, without any of the normal fairness-enforcing overheads associated with arbitration.

Figure 7:
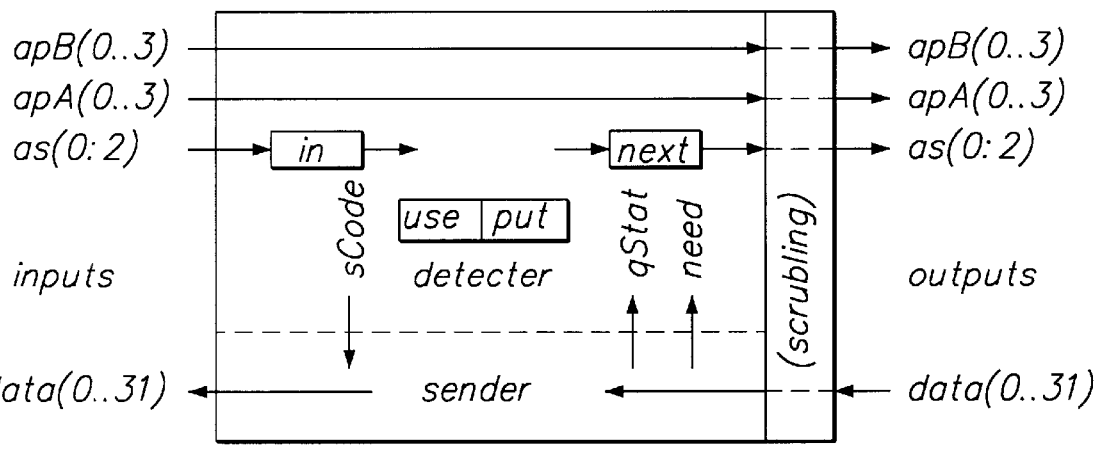
FIG. 7 depicts a scrubber according to an exemplary embodiment of the present invention.

As mentioned above, in addition to ringlet maintenance functions, scrubbing nodes perform aging of arbitration select values, i.e., to restore the as and apA/apB values to their idle states after transient overload conditions have been resolved. FIG. 7 illustrates an exemplary scrubbing node 70. Therein, the output apB value is set equal to the input apA value, the output apA value is zero and the output arbitration select value is an aged version of the value stored in the next buffer. This provides a technique for deasserting arbitration priority after the arbitration has been resolved. As described above, aging of the arbitration select value involves a STOP-to-SEND conversion, a SEND-to-FREE conversion and a SEEN-to-SEND conversion as specified in Table 5 below.

TABLE 5

Scrubber's *as*-Value Conversions

| next | *as* input | Description |
|---|---|---|
| FREE, SEND, SEEK | FREE | Idle arbitration conditions restored |
| STOP | SEND | STOP indication aging, start fair sending |
| SEEN | SEEK | Fair sending indications complete, another node blocked |

Figure 8:
FIG. 8 illustrates a node similar to that of FIG. 6 except that it is configured to provide a reverse-flow arbitration control path.

The foregoing exemplary embodiments provide for arbitration control in the forward direction, i.e., in the same direction that data packets are transmitted. However, according to other exemplary embodiments of the present invention, it may be desirable to have the arbitration information flowing in a reverse control path. FIG. 8 illustrates the scrubbing node of FIG. 6 implemented to provide a reverse-flow control path. If a system is amenable to providing the physical circuitry associated with a reverse-flow control path, this configuration may provide several advantages. For example, faster arbitration response may be achieved since communication to upstream nodes will be more rapid using a reverse-flow control path and upstream nodes are more likely to be the cause of transient data path congestion conditions. Moreover, the arbitration response itself may be improved since inactive nodes can contribute the use of their bypass buffers to generate additional idle symbols for the benefit of currently blocked nodes. This will result in quicker and more efficient resolution of arbitrations.

The operation of a reverse-flow arbitration protocol according to this exemplary embodiment of the present invention is much the same as that described above with respect to, for example, the arbitration select values and their functionality in controlling the throttling of other nodes. However, some of the internal node indicators may employ slightly different values to take advantage of the reverse-flow control path. For example, the qStat indicator and the sCode indicator may have the values described below in Tables 6 and 7.

TABLE 6

Internal qStat Sense Values

| qStat value | bypass FIFO | sending FIFO | send start | Description |
|---|---|---|---|---|
| MORE0 | partially full | >½ full | no | Recovery >½ complete, send is queued. |
| MORE1 | full | <½ full | " | Recovery <½ complete, send is queued. |
| SOME0 | partially full | >½ full | " | Recovery >½ complete, no send queued. |
| SOME1 | full | <½ full | " | Recovery <½ complete, no send queued. |
| DONE | empty | empty | yes | First send-packet symbol being sent. |

TABLE 7

Internal sCode Control Values

| sCode value | send packets | consume idles | Description |
|---|---|---|---|
| PUSH | yes | yes | normal idle condition. |
| WAIT | no | yes | fair arbitration backoff. |
| FILL | no | no | throttled arbitration backoff. |

As seen in Table 6, the MORE and SOME qStat values have additional variants which can be added to optimize the reverse flow control embodiments' opportunity to receive extra idle symbols. If a node becomes blocked, and an upstream node has a partially full bypass FIFO, then that upstream node can hold off forwarding passing-through packets and instead forward additional idle symbols, which will expedite unblocking the blocked node. Thus, MORE0 and SOME0 provide the detector with knowledge of the sender's status as being able to forward additional idles, whereas MORE1 and SOME1 indicate to the detector that the sender cannot forward additional idle symbols. In the former case, the detector would (upon receiving a throttling arbitration select value) instruct the sender using the FILL command of Table 7. In the latter case, the detector would instruct the sender using the WAIT command of Table 7.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What I claim is:

1. A computer system comprising:
   a plurality of nodes connected in a ring using a plurality of point-to-point links;
   at least one forwarding device associated with each of said plurality of nodes for forwarding data packets and idle symbols via an associated one of said plurality of point-to-point links;
   wherein said idle symbols include a field containing a first arbitration value; and
   a scrubber associated with one of said plurality of nodes for performing maintenance functions associated with forwarding of said data packets and for converting said first arbitration value to a second arbitration value wherein said first arbitration value commands said plurality of nodes to stop sending said data packets and said second arbitration value permits said plurality of nodes to send one more of said data packets.

2. The computer system of claim 1, wherein at least two of said plurality of nodes include a central processing unit.

3. The computer system of claim 1, wherein said maintenance functions include handling misaddressed data packets.

4. The computer system of claim 1, wherein one of said plurality of nodes which becomes blocked initiates forwarding of said idle symbols containing said first arbitration value.

5. The computer system of claim 4, wherein said one of said plurality of nodes is permitted to send one of said data packets when it receives one of said idle symbols containing said second arbitration value as converted by said scrubber.

6. The computer system of claim 5, wherein said one of said plurality of nodes delays forwarding said idle symbols containing said second arbitration value until it becomes unblocked.

7. The computer system of claim 6, wherein if said one of said plurality of nodes becomes blocked again after forwarding said idle symbols containing said second arbitration value, but before said scrubber converts said second arbitration value to a third arbitration value, then said one of said plurality of nodes begins forwarding idle symbols containing a fourth arbitration value.

8. The computer system of claim 1, wherein said point-to-point links are bi-directional.

9. The computer system of claim 8, wherein said idle symbols circulate in a direction opposite to that of said data packets.

10. The computer system of claim 9, wherein, in response to receipt of one of said idle symbols including said first arbitration value, one of said plurality of nodes begins to forward additional idle symbols.

11. A method for allocating bandwidth to nodes interconnected as a ringlet comprising the steps of:
    circulating data packets and out-of-band information within said ringlet;
    providing, within said out-of-band information, one of at least three different arbitration command values;
    detecting, within each node in said ringlet, said one of said at least three different arbitration command values associated with received out-of-band information; and
    controlling data packet transmission within each node based upon said detected arbitration command values wherein said arbitration command values include: (1) a first value which commands nodes to send said data packets freely between forwarding of passing-through data packets, (2) a second value which commands said nodes to stop transmitting said data packets, and (3) a third value which commands said nodes to send only one additional one of said data packets.

12. The method of claim 11, wherein said step of circulating further comprises:
    providing said out-of-band information as idle symbols which are transmitted as fillers between said data packets.

13. The method of claim 11, further comprising the step of:
    converting, at a scrubber within said ringlet, said one of said at least three different arbitration command values to another one of said at least three arbitration command values.

14. The method of claim 11, wherein said step of circulating further comprises:
   circulating said out-of-band information in a direction opposite to that of said data packets.

15. The method of claim 11, wherein said step of providing further comprises the step of:
   providing an arbitration priority associated with said at least one of three different arbitration command values.

16. A node for handling transmission of data packets within a processing system comprising:
   a sending section for forwarding data packets created within said node and for forwarding passing-through data packets received from another node, said sending section including a sending buffer for buffering said data packets created within said node and a bypass buffer for buffering said passing-though data packets, wherein said sending section generates a status indication based upon a current capacity of said sending buffer and said bypass buffer; and
   a detection section, for receiving said status indication and a first arbitration value received from said another node, and for forwarding a second arbitration value, wherein said detection selection selects said second arbitration value to be one of the same as said first arbitration value and different than said first arbitration value based upon a value of said status indication.

17. An arbitration method for use in a packet data system having a plurality of nodes connected by point-to-point links, the method comprising the steps of:
   circulating a first arbitration value among said plurality of nodes; and
   aging said first arbitration value at one of said plurality of nodes by converting it to a second arbitration value wherein the first arbitration value commands said plurality of nodes to stop sending data packets and the second arbitration value permits the plurality of nodes to send one more data packet.

18. The method of claim 17, wherein said one of said nodes is a scrubber.

19. The method of claim 17, further comprising the steps of:
   forwarding data packets between said nodes in a direction that is opposite to that in which said arbitration values are circulated.

20. The method of claim 17, wherein said step of circulating further comprises the step of:
   circulating at least one arbitration priority value with said arbitration value.

21. The method of claim 20, wherein said step of aging further comprises the step of:
   aging said at least one arbitration priority value.

22. The method of claim 21, wherein said step of aging said at least one arbitration priority value further comprises the steps of:
   moving said at least one arbitration priority value from a first field to a second field; and
   setting said first field equal to zero.

* * * * *